Jan. 9, 1951          A. B. SIMMONS          2,537,917
                      RETICLE MOUNT
Filed Sept. 28, 1945                      2 Sheets-Sheet 1
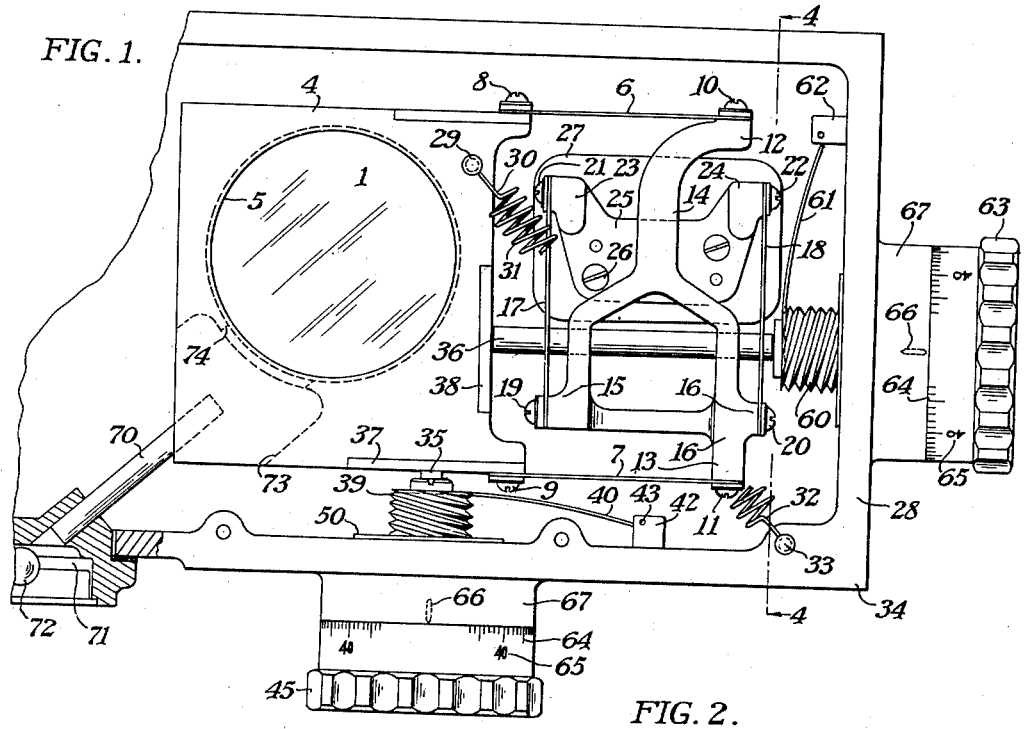
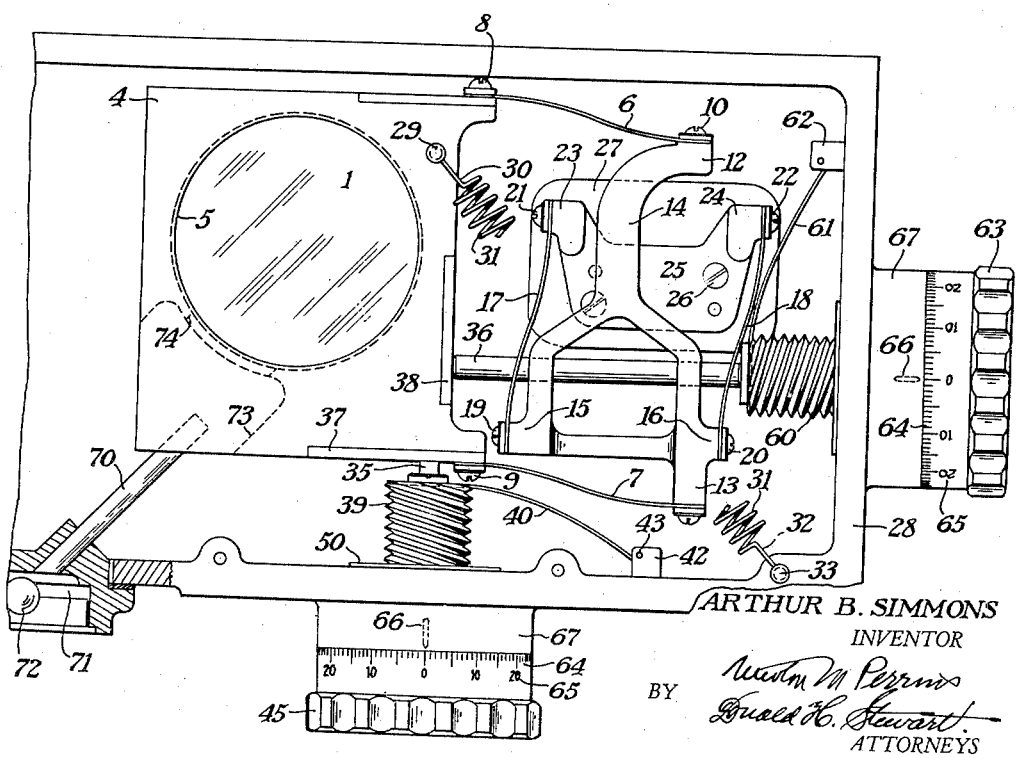
ARTHUR B. SIMMONS
INVENTOR
BY
ATTORNEYS Jan. 9, 1951  A. B. SIMMONS  2,537,917
RETICLE MOUNT
Filed Sept. 28, 1945  2 Sheets-Sheet 2
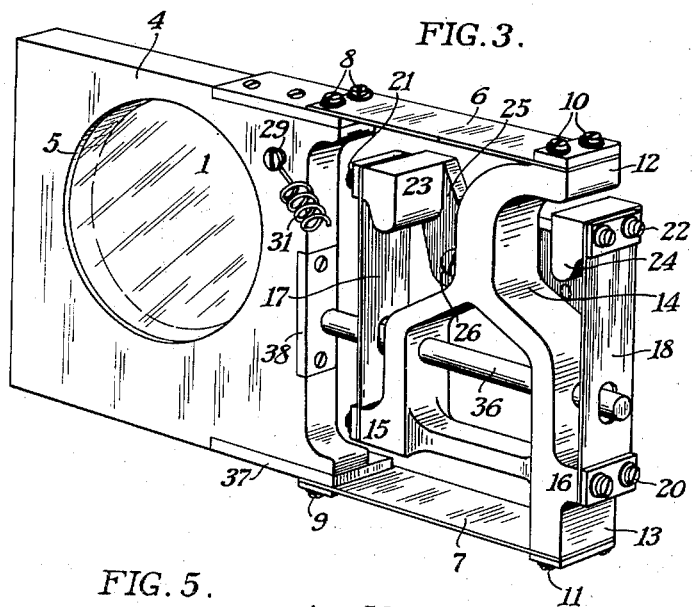
FIG. 3.
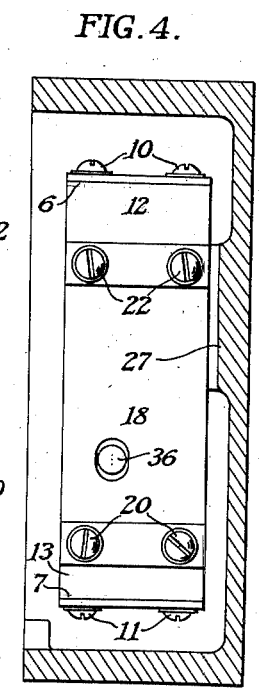
FIG. 4.
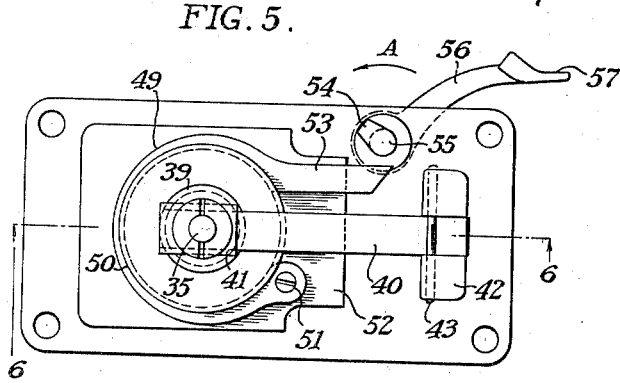
FIG. 5.
FIG. 7.
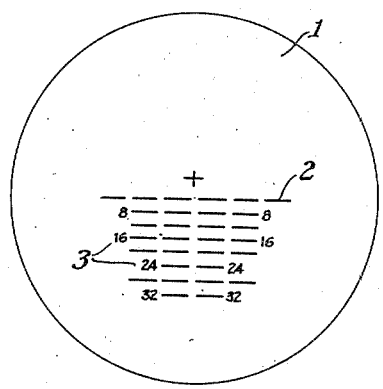
FIG. 6.
ARTHUR B. SIMMONS
INVENTOR
BY
ATTORNEYS Patented Jan. 9, 1951

2,537,917

UNITED STATES PATENT OFFICE 2,537,917

RETICLE MOUNT

Arthur B. Simmons, Rochester, N. Y., assignor to Eastman Kodak Company, Rochester, N. Y., a corporation of New Jersey Application September 28, 1945, Serial No. 619,230

5 Claims. (Cl. 33—46)

This invention relates to reticle mounts for optical instruments. One object of my invention is to provide a mount for reticles in which the reticle may be held in any set position from which position it may be readily and accurately adjusted to other positions. Another object of my invention is to provide a mount for reticles in which the reticle may be adjusted in any direction in its own plane. A still further object of my invention is to provide a means for very accurately positioning the reticle and for latching it in a set position. Other objects will appear from the following application, the novel features being particularlly pointed out in the claims at the end thereof.

In numerous optical instruments, such as fire-control instruments, range finders, periscopes, and various other instruments, reticles are used to align objects to determine the line of sight, to determine deflection, and for other purposes. In many of these instruments, it is desirable to provide a reticle which can be readily adjusted, both as an initial factory adjustment and as a field adjustment. Such adjustments are particularly necessary where the instrument is in, or works in conjunction with, other elements which may be differently positioned when repairs or replacements are made, and my present invention is particularly directed to a means for quickly and accurately adjusting a reticle and for holding it in any adjusted position.

Coming now to the drawings wherein like reference characters denote like parts throughout:

Fig. 1 is a fragmentary rear elevation of a portion of an optical device equipped with an adjustable reticle mount constructed in accordance with and embodying a preferred form of my invention, the reticle mount being shown in a normal position of adjustment;

Fig. 2 is a view similar to Fig. 1 but with the reticle moved to one extreme of its possible adjustment;

Fig. 3 is a perspective view of the reticle holder and mount removed from an optical instrument;

Fig. 4 is a section taken on line 4—4 of Fig. 1 through a portion of a reticle housing with the reticle mount in place;

Fig. 5 is a rear elevation of one of the adjusting knobs particularly showing the knob latching mechanism;

Fig. 6 is a section taken on line 6—6 of Fig. 5; and

Fig. 7 is a view of a typical reticle removed from its support.

My invention consists in a mount which is so constructed that an element carried thereby may be retained in a plane and which includes a means for moving the element in its plane in different directions and to different extents to properly locate the element with respect to the optical instruments in which it is mounted. Usually, the element is a reticle on an object carrier which is designed to cooperate in a special manner with one or more optical elements. In addition, I provide adjusting knobs with suitable scale graduations to position the reticle, or other element, and to determine the exact adjustment of the adjustable element in any position so that, if necessary, the settings can be repeated at will or adjusted at will. By way of illustration I show a mount, constructed in accordance with my invention, carrying a reticle particularly adapted for use in tank periscopes.

More specifically, my invention may consist of a reticle which, as shown in Fig. 7, is preferably constructed of an optical glass flat 1 carrying suitable graduations and markings 2 which with the figures or letters 3 form a suitable scale for the particular instrument in which the reticle is to be used. The reticle 1 may be mounted in a frame 4, this frame having a central aperture 5 to receive the reticle and being carried by a pair of flat strips 6 and 7, these strips being attached to the reticle frame 4 by means of suitable screws 8 and 9. The strips 6 and 7 are of substantial width, as shown, and, accordingly, are relatively inflexible transversely of their width but they are, nevertheless, quite flexible in a vertical direction as viewed in the drawings. In other words, the strips 6 and 7 will permit the reticle 1 to be raised and lowered on the strips 6 and 7 but these strips will retain the reticle and its mount in a vertical plane.

The opposite ends of the strips 6 and 7 are attached by means of screws 10 and 11 to the arms 12 and 13 of a floating frame member 14. This frame member includes outstanding arms 15 and 16 to which the flat metal strips 17 and 18 are attached by means of screws 19 and 20. The opposite ends of the strips 17 and 18 are attached as by screws 21 and 22 to the arms 23 and 24 of a relatively-fixed bracket 25, this bracket being attached by screws 26 to a pad 27 carried by a support or housing 28 which forms a part of the optical instrument. The spring strips 17 and 18 permit the reticle mount 4 to be moved in a generally horizontal direction with respect to the drawings just as the metal strips 6 and 7 permit the reticle mount 4 to move in a generally vertical direction. The normal position of the reticle mount is shown, however, in Fig. 1 in which the strips 6, 7, 17, and 18 are all in a normal position of rest in which these leaf spring members remain unflexed.

The reticle mount 4 carries a pin 29 to which one end 30 of a spring 31 is attached, the opposite end 32 of this spring being attached to a pin 33 in the casing 28. This spring tends to hold the reticle mount 4 towards the corner 34 of the casing 28, but the movement of the mount 4 is limited by means of the bearing pins 35 and 36 which rest on the bearing plates 37 and 38 carried by the reticle mount 4. The bearing pin 35, as shown in Fig. 6, may be carried by a screw member 39 which is held against rotation by means of a spring 40 passing through a slot 41 in the screw member and lying between the bracket arms 42 and beneath the bracket pin 43. Thus, the spring member 40 prevents the screw member 39 from being turned when the threaded sleeve 44 is turned by means of the adjusting knob 45 to which it is attached by a set screw 46. The screw sleeve 44 therefore moves the screw 39 back and forth when the knob 45 is turned since the interiorly-threaded sleeve 44 may turn freely in the bearing 47 in the wall 48 of the casing housing.

In order to hold the knob 45 in a set position, I provide a flexible strap 49 which lies about the interiorly-threaded sleeve 44 and beneath the flange 50. This strap, as shown in Fig. 5, is pivoted at 51 to a part 52 of the housing, and it includes an offset arm 53 lying in the path of a locking cam 54. This cam, carried by the shaft 55, moves with an arm 56 having a locking handle 57. In Fig. 5 the parts are shown in a released position in which the knob 45 can be freely moved and when the desired setting is reached, the locking handle 57 may be turned in the direction shown by the arrow A so that the cam 54 presses down on the outwardly-extending arm 53 causing the strap 49 to engage and hold the sleeve 44 and with it the knob 45 fixedly in a set position. Thus, the knob 45 may be used to adjust the reticle mount 4 in a generally vertical direction with respect to the drawings. Adjustment of the reticle and its mount in a generally horizontal direction is accomplished in exactly the same manner by the adjusting pin 36 which is carried by a screw member 60 which is prevented from being turned by the spring arm 61 held by the bracket 62 in exactly the same manner as the spring 40 described fully above. The adjusting pin 36 may be turned by a knob 63. Since this knob is constructed exactly the same as knob 45, it need not be further described. It should be noticed that each of the knobs 45 and 63 is provided with similar graduations 64 which include scale members 65 which are adapted to be brought opposite a scribe line 66 on the bottom side of the bearings 67 with respect to the drawings. These scales and pointers may accurately indicate the position of the reticle and may serve to indicate just how the reticle adjustment should be made to overcome noted errors and the like.

The operation of setting up an optical instrument with my improved adjustable reticle mount is as follows: With the latching mechanism in its released, or Fig. 5, position, the knobs 45 and 63 are turned until the reticle lines 2 are in the proper position with reference to a target or whatever system is used in setting up the optics of the particular instrument on which the mount is carried. By turning the knob 45, the reticle 1 is raised and lowered with respect to Fig. 1 and by adjusting the knob 63, it is moved sideways. The spring 31, of course, always holds the reticle mount against the adjusting pins 35 and 36, and since the spring members 6, 7, 17, and 18 flex only in the direction of the plane in which the reticle is mounted, the fixed bracket and the floating bracket with these strips makes a mount on which the reticle can be moved in any direction and in its own plane.

Applicant has not shown the latch of Fig. 5 in Figs. 1 and 2 to simplify the drawing, but it is to be understood that each of the knobs 45 and 63 has identically the same latching mechanism as shown in Fig. 5. Thus, after once adjusting the two knobs and properly locating the reticle, the handles 57 may be swung to their latching position and the reticle will be rigidly retained in its proper position. It frequently happens where the optical device is a fire control instrument that when a gun is adjusted, or replaced, an adjustment is necessary and this can readily be made by merely releasing the latching members 57 and turning the knobs 45 and 63. If it should be found, for instance, that upon test the gun is not exactly aligned axially with the fire control instrument, it is a simple matter to adjust the reticle so that the gun and fire control instrument are accurately aligned.

Obviously, various different types of engraved or etched lines 2 and 3 may be used on the reticle 1 and I have merely shown one form which is suitable for a particular optical instrument with which my adjustable reticle can be used.

It is frequently necessary in order to make the lines and graduations 2 and 3 more readily visible —particularly for night work—to illuminate this scale. In order to accomplish this, I have provided a light-transmitting rod 70 which may be made of a suitable clear plastic material, or of glass; this rod leading into a small chamber 71 in which an electric lamp 72 is mounted. The interior reflection of the rod 70 transmits a beam of light to the reticle and illuminates the scale carried thereby. This rod may extend into a suitable opening 73 in the reticle mount, so that the light rays may pass through a window 74 to impinge upon the reticle. The artificial illumination of the reticle may or may not be used.

I have found that my flat spring mounting can be used to advantage in many precision instruments, such as toolmakers' microscopes, spring-suspended stage for microscopes, periscopes, and other instruments where it is necessary or desirable to provide for accurate movement of an element, such as a reticle, in a plane and where it is necessary to accurately measure or control such movement. I have described my invention as particularly adapted for use as a reticle mount for periscopes, but it is obvious that my invention is not limited to such an instrument. I consider as within the scope of my invention all modifications which come within the scope of the appended claims.

Where I have used the "recticle" in the specification and claims, it is to be understood to include the usual type of "reticle" for centering a line of sight and/or having a scale for measuring or the like, or the term may include any other element movable in a plane so as to be registerable, or positionable, with respect to an optical system. Thus, the term may include various elements accurately adjustable in a plane, such as an adjustable stage for a microscope, or a target, as well as the usual type of reticle.

I claim:

1. A reticle mount for optical instruments comprising, in combination, a support, a reticle and its holder, a floating bracket, a fixed bracket carried by the support, leaf springs connecting the reticle holder and the floating bracket, leaf springs connecting the floating bracket and the fixed bracket, each spring having a width formed by flat surfaces many times the thickness thereof and being flexible only in the direction of their thickness but not in a direction transversely thereto, all springs having their edges facing in a direction transverse to the plane of the reticle, stops limiting movement of the reticle holder in two directions, and means for adjusting the stops.

2. A reticle mount for optical instruments comprising, in combination, a support, a reticle and its holder, a floating bracket, a fixed bracket carried by the support, leaf springs connecting the reticle holder and the floating bracket, leaf springs connecting the floating bracket and the fixed bracket, each spring having a width formed by flat surfaces many times the thickness thereof and being flexible only in the direction of their thickness but not in a direction transversely thereto, all springs having their edges facing in a direction transverse to the plane of the reticle, stops limiting movement of the reticle holder in two directions comprising stop pins, screws for moving the stop pins, knobs for adjusting the screws, and latches for the screws for holding the stop pins in a fixed position.

3. A reticle mount for optical instruments comprising, in combination, a reticle, a holder therefor, a support, and means for movably carrying the reticle from the support for movement in a plane including pairs of leaf springs, one pair at right angles to the other pair between the reticle and the support, one pair of springs attached to the holder, a floating bracket attached to the springs attached to the holder, a fixed bracket on said support, the second pair of springs each being attached to the floating bracket and the fixed bracket, all springs being flexible to suspend the reticle holder for movement in a plane but not transversely thereof, adjustable stops carried by the support, and a spring positioned to move and hold the reticle holder in contact with the adjustable stops.

4. For use in precision instruments in which movement of an element in a plane is required, an element holder, a support, a floating bracket, and means for resiliently carrying the element holder in the support including oppositely disposed pairs of flat spring members each flexible transversely of their width but substantially inflexible edgewise, one pair of flat spring members being positioned at substantially right angles to the other, one pair of flat spring members connecting the support and the floating bracket and the other pair of flat springs connecting the floating bracket and the element holder, angularly disposed stop members, and a spring for holding the element holder against the stop members, an adjusting knob for each stop member and means for accurately designating the position of each stop member comprising a scale and a pointer graduated into units of distance, and locking means for holding each adjustable knob in a predetermined position.

5. For use in precision instruments in which movement of an element in a plane is required, an element holder, a support, and means for resiliently carrying the element holder in the support to move in its plane and including oppositely disposed pairs of flat spring members each flexible transversely of their width but substantially inflexible edgewise, one pair of flat spring members being positioned at substantially right angles to the other, both of said pairs of flat spring members preventing movement of the element holder transversely of the plane thereof, a fixed bracket on said support and a floating bracket, one pair of flat springs connecting the two brackets, and the second pair of flat springs connecting the floating bracket and the element holder, a spring tending to move the element holder diagonally with respect to the pairs of leaf springs, and means impinging upon the element holder for retaining the element holder in a predetermined position.

ARTHUR B. SIMMONS.

REFERENCES CITED

The following references are of record in the file of this patent:

UNITED STATES PATENTS

| Number | Name | Date |
|---|---|---|
| 843,183 | Smith | Feb. 5, 1907 |
| 892,731 | Jacob | July 7, 1908 |
| 1,894,025 | Dennison et al. | Jan. 10, 1933 |
| 1,950,790 | Fahrenwald | Mar. 13, 1934 |
| 2,150,629 | Mossberg | Mar. 14, 1939 |
| 2,189,766 | Unertl | Feb. 13, 1940 |
| 2,261,978 | Dircksen | Nov. 11, 1941 |

FOREIGN PATENTS

| Number | Country | Date |
|---|---|---|
| 110,814 | Austria | Oct. 10, 1928 |
| 178,106 | Germany | Nov. 8, 1906 |
| 685,573 | Germany | Dec. 20, 1939 |